(12) United States Patent
Isaksson et al.

(10) Patent No.: US 8,182,408 B2
(45) Date of Patent: May 22, 2012

(54) CENTRIFUGAL SEPARATOR WITH EXTERNAL BEARINGS

(75) Inventors: Roland Isaksson, Grodinge (SE); Peter Thorwid, Sundbyberg (SE)

(73) Assignee: Alfa Laval Corporate AB, Lund (SE)

( * ) Notice: Subject to any disclaimer, the term of this patent is extended or adjusted under 35 U.S.C. 154(b) by 810 days.

(21) Appl. No.: 12/300,802

(22) PCT Filed: May 15, 2007

(86) PCT No.: PCT/SE2007/050329
§ 371 (c)(1),
(2), (4) Date: Nov. 14, 2008

(87) PCT Pub. No.: WO2007/133161
PCT Pub. Date: Nov. 22, 2007

(65) Prior Publication Data
US 2009/0186752 A1 Jul. 23, 2009

(30) Foreign Application Priority Data
May 15, 2006 (SE) ........................................ 0601079

(51) Int. Cl.
*B04B 9/04* (2006.01)
(52) U.S. Cl. ................................ 494/70; 494/83; 494/84
(58) Field of Classification Search .................... 494/43, 494/46, 67–73, 82–84; 464/179–180
See application file for complete search history.

(56) References Cited

U.S. PATENT DOCUMENTS

| | | | |
|---|---|---|---|
| 2,465,154 A * | 3/1949 | Harstick | 494/4 |
| 5,364,335 A | 11/1994 | Franzen et al. | |
| 6,709,477 B1 | 3/2004 | Haakansson et al. | |
| 2001/0012814 A1* | 8/2001 | May et al. | 494/24 |
| 2002/0016245 A1 | 2/2002 | Zettier | |
| 2006/0276321 A1* | 12/2006 | Pitkamaki et al. | 494/15 |
| 2009/0186752 A1* | 7/2009 | Isaksson et al. | 494/40 |
| 2010/0255976 A1* | 10/2010 | Mackel et al. | 494/15 |

(Continued)

FOREIGN PATENT DOCUMENTS

DE 10300976 7/2003

(Continued)

OTHER PUBLICATIONS

International Search Report, International Application No. PCT/SE2007/050329, date mailed Jul. 4, 2007.

*Primary Examiner* — Charles E Cooley
(74) *Attorney, Agent, or Firm* — Michaud-Kinney Group LLP

(57) ABSTRACT

A centrifugal separator includes a rotating centrifuge rotor having a casing which defines an inner separation space. A set of separation discs is provided in the inner separation space. The centrifugal separator includes a torque transmitting part connected to the centrifuge rotor. A drive motor drives the torque transmitting part for rotation of the centrifuge rotor. The drive motor has a first axial end turned towards the centrifuge rotor and a second axial end turned away from the centrifuge rotor. The centrifugal separator includes a stationary frame and a first bearing and a second bearing, which are connected to the frame. The torque transmitting part is rotatably journalled in the first bearing and the second bearing. The first bearing is provided between the drive motor and the centrifuge rotor. The second bearing is provided outside the second axial end of the drive motor.

16 Claims, 4 Drawing Sheets

U.S. PATENT DOCUMENTS

| | | | |
|---|---|---|---|
| 2011/0124481 A1* | 5/2011 | Karlsson | 494/83 |
| 2011/0212820 A1* | 9/2011 | Klintenstedt | 494/46 |

FOREIGN PATENT DOCUMENTS

| | | | |
|---|---|---|---|
| DE | 102009019950 A1 * | 11/2010 | |
| EP | 241128 A | 12/1986 | |
| GB | 409196 A | 4/1934 | |
| GB | 2277700 | 11/1994 | |
| SE | 348121 B | 8/1972 | |
| SU | 532396 A1 | 10/1976 | |
| SU | 662152 A * | 5/1979 | |
| SU | 1194504 | 11/1985 | |
| WO | 9845050 | 10/1998 | |
| WO | 0100969 | 1/2001 | |

* cited by examiner

CENTRIFUGAL SEPARATOR WITH EXTERNAL BEARINGS

FIELD OF THE INVENTION

The present invention refers to a centrifugal separator for centrifuging components contained in a liquid mixture and having different densities.

BACKGROUND

Such a centrifugal separator is disclosed in SU-1194504 which discloses a centrifugal separator with a centrifuge rotor fed from above through a central channel. The centrifuge rotor, which is driven by means of an electric motor. The electric motor comprises a stator, is fixedly mounted to a stationary casing, and a rotor which is fixedly mounted to the rotating casing of the centrifuge rotor. The electric motor is thus located axially at the level of the centrifuge rotor.

GB-A-2 277 700 discloses a centrifugal separator, where the centrifuge rotor is mounted directly to the spindle which in turn is directly connected to an electric drive motor which thus is located outside the centrifuge rotor. With such an arrangement, one of the ends of the centrifuge rotor is accessible for supply and/or discharge of material to and from the inner separation space of the centrifuge rotor. In order to enable supply and discharge through both ends of the centrifuge rotor, it is known to mount the centrifuge rotor on a so-called hollow spindle, SE-B-348121. With such a centrifuge rotor, the driving may take place by means of a motor which is provided beside the centrifuge rotor and the spindle. The power transmission from the drive motor to the spindle is performed by means of, for instance, drive belts or a screw gear.

The electric motors which available today may be controlled in a and operated at high number, of revolutions per minute. It is therefore desirable to be able to operate the centrifuge rotor by direct drive.

DE-A-10300976 discloses a centrifuge comprising a stationary shaft on which a stator is mounted. A rotor having rotor blades is journalled on the shaft. The drive motor is centrally provided in the centre of the centrifuge inside the rotor. In another embodiment, a centrifuge is described that has a rotor supplied with a medium via a stationary central channel. The driving is performed by means of electromagnetic coils provided on a stationary casing outside the rotor. The rotor comprises a disc with alternating magnetisable areas.

U.S. Pat. No. 6,709,477 discloses a centrifugal separator having a hollow spindle. The centrifuge is intended for turbine drive by means of an inlet pipe and turbine rotor.

US2002/0016245 discloses a centrifugal separator having a hollow spindle and an inlet from beneath and an outlet from above. The driving is not described more closely.

GB-A-409,196 discloses a centrifugal separator having a hollow spindle for feeding from beneath. The spindle is journalled in two bearings. The driving is not described more closely.

WO 98/45050 discloses a device for dynamic classification of carbon powder. The device comprises a rotating spindle which carries a rotor member consisting of axially and radially directed wings. The spindle is hollow and extends through a drive motor having a stator and a rotor. The spindle is fixedly attached to the rotor of the drive motor.

USB-2001-0012814 discloses a centrifugal filter for filtering partials from a liquid. One embodiment refers to a rotor in the form of a filter element with a rotating hollow shaft and a casing. On or radially outside the shaft, filter means are provided. This filter means do not constitute separation discs. The purpose of these filter means is to filtrate liquid and catch particles in the filter means. On the rotor, magnets are mounted. By means of the rotor magnets, an electric motor is created with a stator not disclosed. Liquid to be filtered may be supplied via an inlet and upwardly through a stationary shaft and into the rotating hollow shaft of the rotor. An outlet for the filtered liquid is provided at a large distance from the centre axis.

SUMMARY OF THE INVENTION

In one aspect, a centrifugal separator is initially described and has a drive motor provided axially outside the centrifuge rotor in the direction of the centre axis.

By means of such an axially outside the centrifuge rotor disposed drive motor with low energy losses are achieved at the same time as the centrifugal separator obtains a compact construction. The cavity through the drive motor may form a channel and be used for transporting liquid, for instance the mixture to be treated, the treated product, hydraulic liquids etc, in a central part of the centrifugal separator. In such a way, the transport may take place in a manner which requires relatively low energy. The cavity may form the separation space of the centrifugal separator or a channel for transport of liquids.

According to an embodiment of the invention, the drive motor is an electric drive motor. The drive motor may in an easy manner be released in the form of such an electric motor for driving the centrifuge rotor. However, it is to be noted that the drive motor also may be released in the form of a hydraulic or pneumatic motor.

According to a further embodiment of the invention, channels extend concentrically to the centre axis. Advantageously, said channels may extend in opposite directions from the separation space. In such a way, the inlet channel and the outlet channel may extend in a respective direction from the separation space, i.e. feeding and discharging may take place from two directions, for instance from above and from beneath. Such a central feeding and discharging gives rise to a low energy consumption.

According to a further embodiment of the invention, the rotor of the drive motor surrounds a cavity which forms at least one of said inlet channel and said outlet channel. In such a way it is possible to utilize both the ends of the centrifuge rotor, normally an upper end and a lower end, for feeding the product to be cleaned through centrifugal separation and discharging the cleaned product and separated components. Both the inlet and the outlet may thus be provided concentrically to the centre axis and a small radial extension. This means that the energy consumption for feeding the clean liquid is relatively low. With the inventive centrifugal separator both direct drive of the centrifuge rotor, without any intermediate transmission equipment, and a possibility to feed and discharge from both sides, for instance from above and from below, thus are achieved.

According to a further embodiment of the invention, the stator of the drive motor surrounds the rotor. The torque transmitting part may then advantageously consist of a spindle which is provided with and connected to the rotor and which is hollow and forms at least one of said inlet channel and outlet channel.

According to another embodiment of the invention, the rotor of the drive motor surrounds the stator. The torque transmitting part may then form a component which is fixedly connected to the centrifuge rotor and which surrounds and is fixedly connected to the rotor of the drive motor, wherein the stator of the drive motor is provided inside the rotor.

According to a further embodiment of the invention, the drive motor has a first axial end which is turned towards the centrifuge rotor and a second axial end which is turned from the centrifuge rotor.

According to a further embodiment of the invention, the cavity has a first opening in the inner separation space of the centrifuge rotor and a second opening outside the second axial end of the drive motor for forming one of said inlet channel and said outlet channel. The mixture, i.e. the mixture of components to be separated through centrifugal separation, may thus be fed through the inlet channel extending through the drive motor and/or the clean product can be discharged through the outlet channel extending through the drive motor.

According to a further embodiment of the invention, the centrifugal separator comprises a stationary pipe provided inside the cavity and extending between the inner separation space of the centrifuge rotor and a position outside the centrifuge rotor for forming one of an inlet or outlet channel for a medium.

Advantageously, the stationary pipe may have an opening outside the second axial end of the drive motor. This means that the stationary pipe may extend in the hollow spindle through the drive motor. In the stationary pipe, a channel permitting feeding and/or discharge of a medium, is thus created. In addition, this construction enables the arrangement of a channel for feeding and/or discharging a medium between the stationary pipe and the inner wall of the cavity.

According to a further embodiment of the invention, the centrifugal separator comprises a stationary frame and at least a bearing connected to the frame, wherein the torque transmitting part is rotatably journalled in said at least one bearing. The stator of the drive motor may then be connected to the frame.

According to a further embodiment of the invention, the centrifugal separator comprises a first bearing and a second bearing, which are connected to the frame, wherein the torque transmitting part is rotatably journalled in the two bearings. The first of the bearings may then be provided between the drive motor and the centrifuge rotor, and the second bearing may be provided outside the second axial end of the drive motor. In such a way a stable support for the spindle and the centrifuge rotor is achieved.

According to a further embodiment of the invention, each separation disc has a conical shape, wherein the separation discs are provided on each other in a stack.

According to a further embodiment of the invention, the stator of the drive motor comprises electrical windings, and the rotor of the drive motor comprises at least one permanent magnet. In such a way a relatively low heat generation is obtained in the rotor of the drive motor, i.e. a small heat influence on the liquid to be transported through the cavity. The drive motor may advantageously comprise an electric synchron motor, especially of the type PMSM (Permanent Magnet Synchron Motor).

BRIEF DESCRIPTION OF THE DRAWINGS

The invention is now being explained more closely by means of a description of advantageous embodiments, which are examples of how to release the invention, and with reference to the drawings attached hereto.

DETAILED DESCRIPTION OF VARIOUS EMBODIMENTS

The invention is now to be described with reference to the various embodiments which are disclosed in FIGS. 1-4. It is to be noted that components having the same or a similar function have been provided with same reference signs in the four embodiments.

Figure 1:
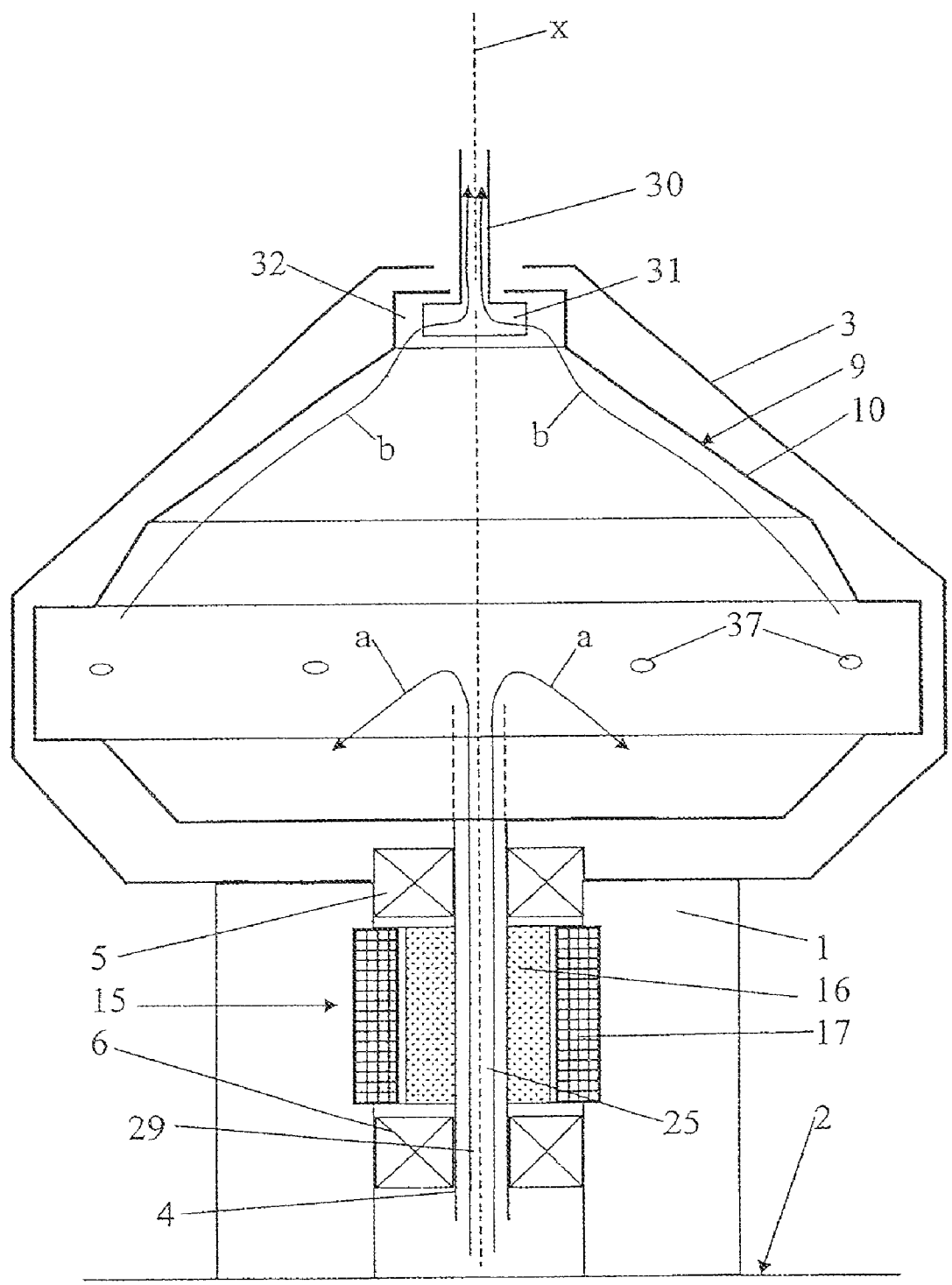
FIG. 1 discloses schematically a centrifugal separator according to a first embodiment of the invention.
Figure 2:
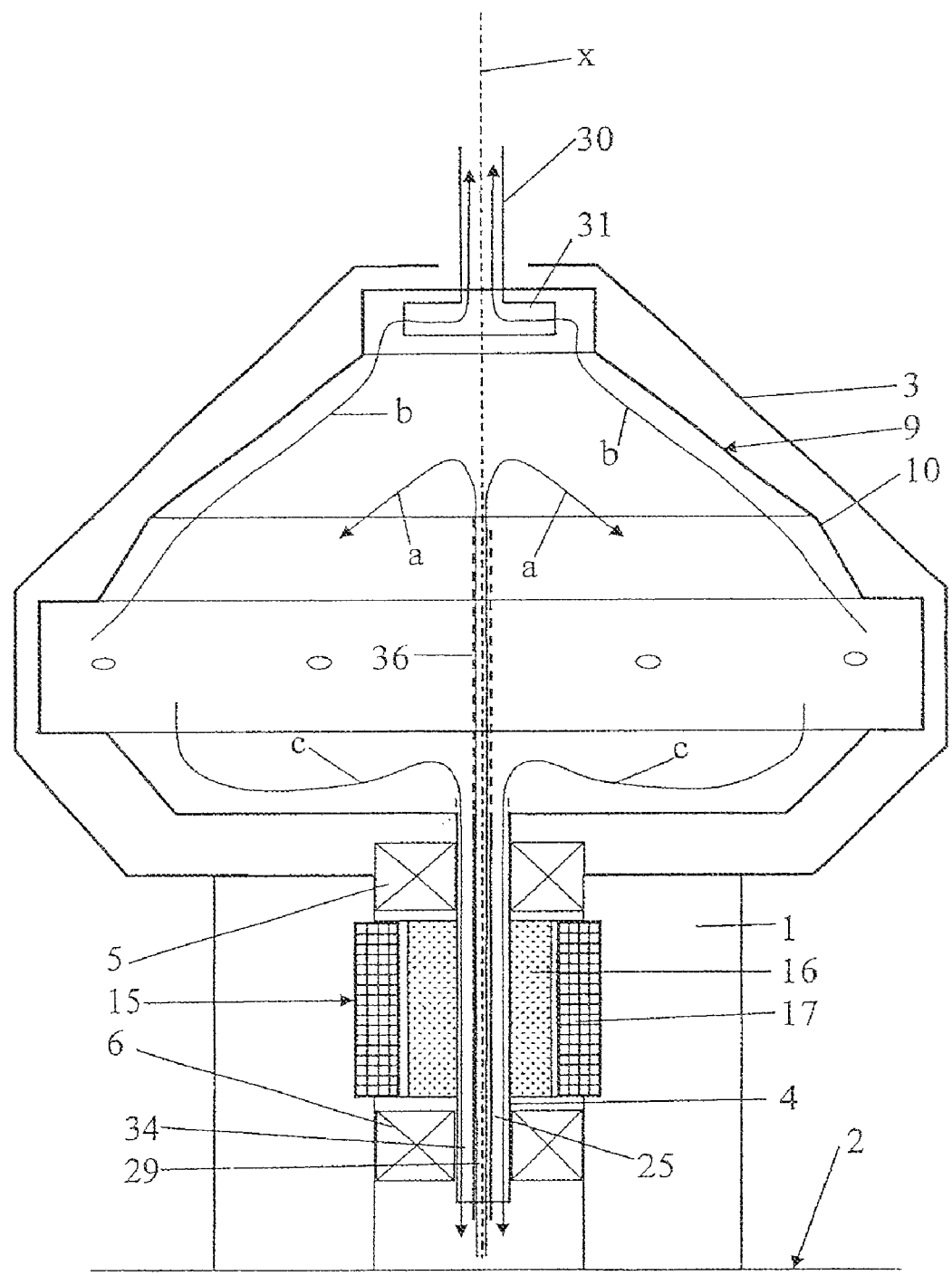
FIG. 2 discloses schematically a centrifugal separator according to a second embodiment of the invention.
Figure 3:
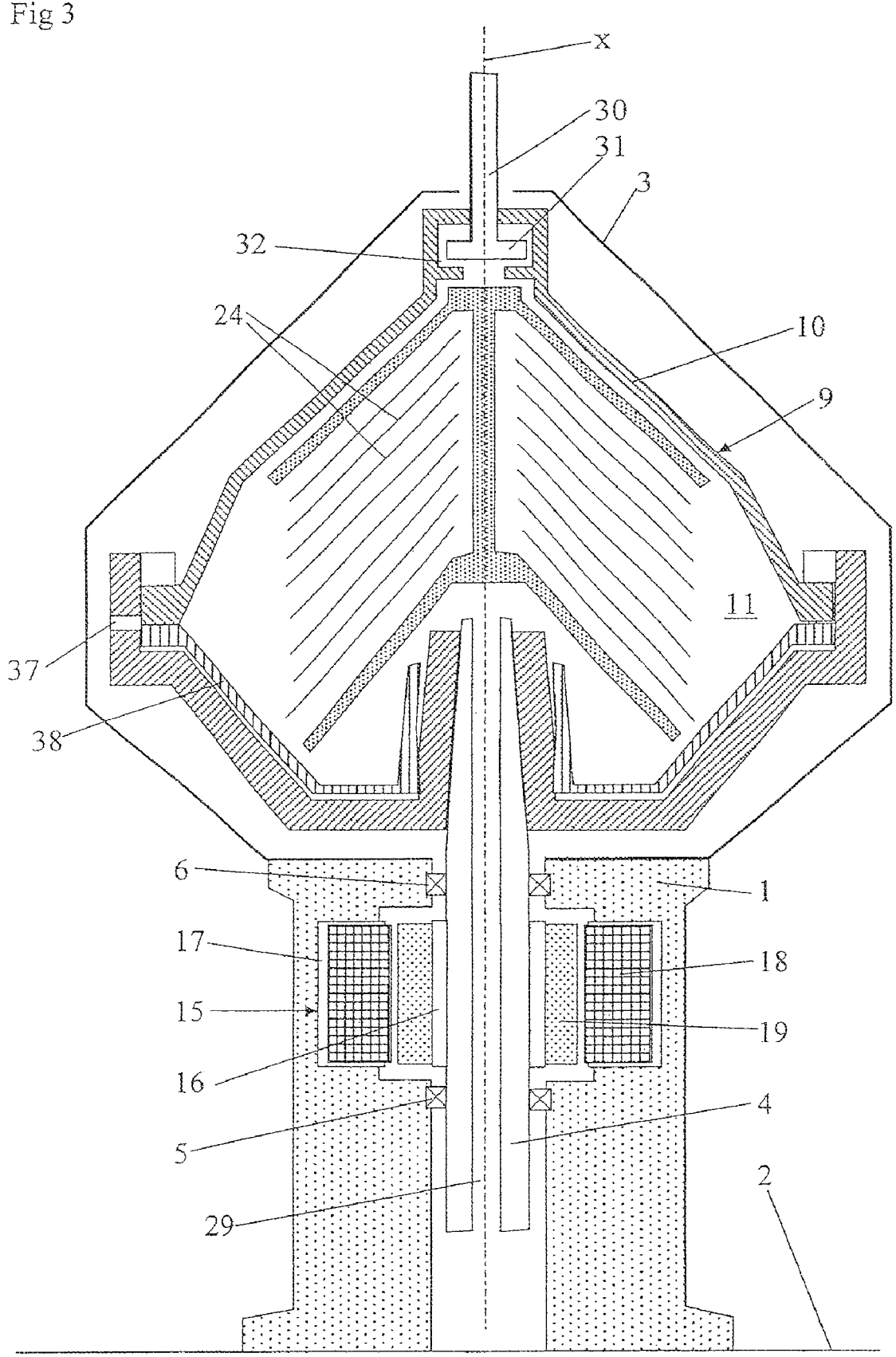
FIG. 3 discloses schematically a centrifugal separator according to a third embodiment of the invention.

As can be seen from FIGS. 1-4, the centrifugal separator comprises a stationary frame 1. The frame 1 comprises a base intended to be located on a suitable substrate 2, such as a floor, and a stationary casing 3 which is provided on the frame 1. The centrifugal separator comprises a rotating torque transmitting part 4, which is journalled in the frame 1 by means of a first bearing 5 and a second bearing 6 and which extends along a centre axis x. In the embodiment disclosed in FIGS. 1-3, the torque transmitting part 4 is designed as a spindle. The centrifugal separator comprises also a centrifuge rotor 9, which is fixedly provided on the rotating part 4. The centrifuge rotor 9 is provided in the stationary casing 3. The centrifuge rotor 9 comprises in a manner known per se a casing 10 which defines or encloses an inner separation space 11, see FIG. 3. In embodiments disclosed in FIGS. 1-3, the spindle extends into the inner separation space 11, as can be seen in FIG. 3.

The centrifugal separator also comprises an electric drive motor 15 which drives the torque transmitting part 4 and thus the centrifuge rotor 9 in such a way that the centrifuge rotor 9 is brought to rotate around the centre axis x. As can be seen from FIGS. 1-3, the torque transmitting part 4 extends through the drive motor 15. The drive motor 15 comprises a rotor 16, which is fixedly connected to the torque transmitting part 4, and a stator 17, which is fixedly connected to the base of the frame 1. The stator 17 of the drive motor 15 surrounds the rotor 16. The drive motor 15 is provided between the first bearing 5 and the second bearing 6. The drive motor 15 is thus located outside the centrifuge rotor 9 in the direction of the centre axis x. In the embodiments disclosed, the drive motor 15 is provided vertically beneath the centrifuge rotor 9. The drive motor 15 thus has a first upper axial end which is turned towards the centrifuge rotor 9 and a second lower axial end which is turned away from the centrifuge rotor 9.

The stator 17 of the drive motor 15 comprises electrical windings 18, and the rotor 16 of the drive motor 15 is premagnetised and comprises at least one, or a set of, permanent magnets 19. The drive motor 15 may advantageously comprise or consist of an electric synchron motor, especially of the type PMSM (Permanent Magnet Synchron Motor), for instance a so-called HPM-motor (Hybride Permanent Magnet) (trademark).

The centrifugal separator also comprises a set of separation discs 24 which are provided in the inner separation space 11 of the centrifuge rotor and rotate with the centrifuge rotor 9 in a manner known per se. The separation discs 24 have in the embodiments disclosed, see FIG. 3, a conical shape and are provided on each other in a stack. Also other kinds of separation discs may be used, for instance such which extend radially and such which extend axially.

According to the embodiments disclosed in FIGS. 1-3, the torque transmitting part 4, which forms a spindle, encloses a cavity 25 forming an inlet channel and/or an outlet channel extending along the centre axis x. According to the first embodiment disclosed in FIG. 1, the cavity 25 of the torque transmitting part 4 has a first opening in the inner separation space 11 of the centrifuge rotor 9 and a second opening outside the second end of the drive motor 15. According to the first embodiment, the cavity 25 forms an inlet channel 29 for a medium, i.e. a product or a mixture to be cleaned through centrifugal separation. The inflow of this medium is indicated with the two arrows a, which extend through the inlet channel 29 into the separation space. According to the first embodiment, the discharge of the cleaned product may take place in a conventional manner through an outlet channel 30 at the upper end of the centrifuge rotor 9, which is indicated with the arrows b.

The outlet channel 30 may comprise a paring member 31 which is provided in a paring chamber 32 in a manner known per se. It is to be noted that the cavity 25 of the torque transmitting part 4 also may be used for discharge of the cleaned product and that feeding of the product to be cleaned instead may take place from above through a feeding pipe extending into the separation space 11.

According to the second embodiment which is enclosed in FIG. 2, the centrifugal separator comprises also a stationary pipe 36, which is provided inside the cavity 25 of the rotating torque transmitting part 4. The stationary pipe 36 extends between a position outside the centrifuge rotor 9 outside the second axial end of the drive motor 15 and a position in the separation space 11. The stationary pipe 36 forms a further channel for feeding or discharge of a medium. In the second embodiment, the stationary pipe 36 is used as inlet channel 29 for feeding of the product to be cleaned. According to the second embodiment, the centrifugal separator permits a central discharge of two different phases which have different density, for instance oil and water. For instance a first medium may be fed through a stationary outlet channel 30 in the same way as in the first embodiment whereas a second medium is fed through the cavity 25 of the torque transmitting part 4, which forms an outlet channel 34 in the space between the stationary pipe 36 and an inner wall of the cavity 25 of the torque transmitting part 4, which is indicated with the arrows c.

The third embodiment, which is disclosed in FIG. 3, comprises a rotating torque transmitting part 4 in the form of a spindle forming an inlet channel for feeding of a product to be cleaned. The cleaned product is discharged through a stationary outlet channel 30 via a paring chamber 32 and a paring member 31. Sludge and solid particles, which have a relatively high density and are collected in a radially outer part of the separation space 11, may be discharged via peripheral openings 37 which may be opened intermittently in a manner known per se through a valve arrangement schematically indicated at 38.

Figure 4:
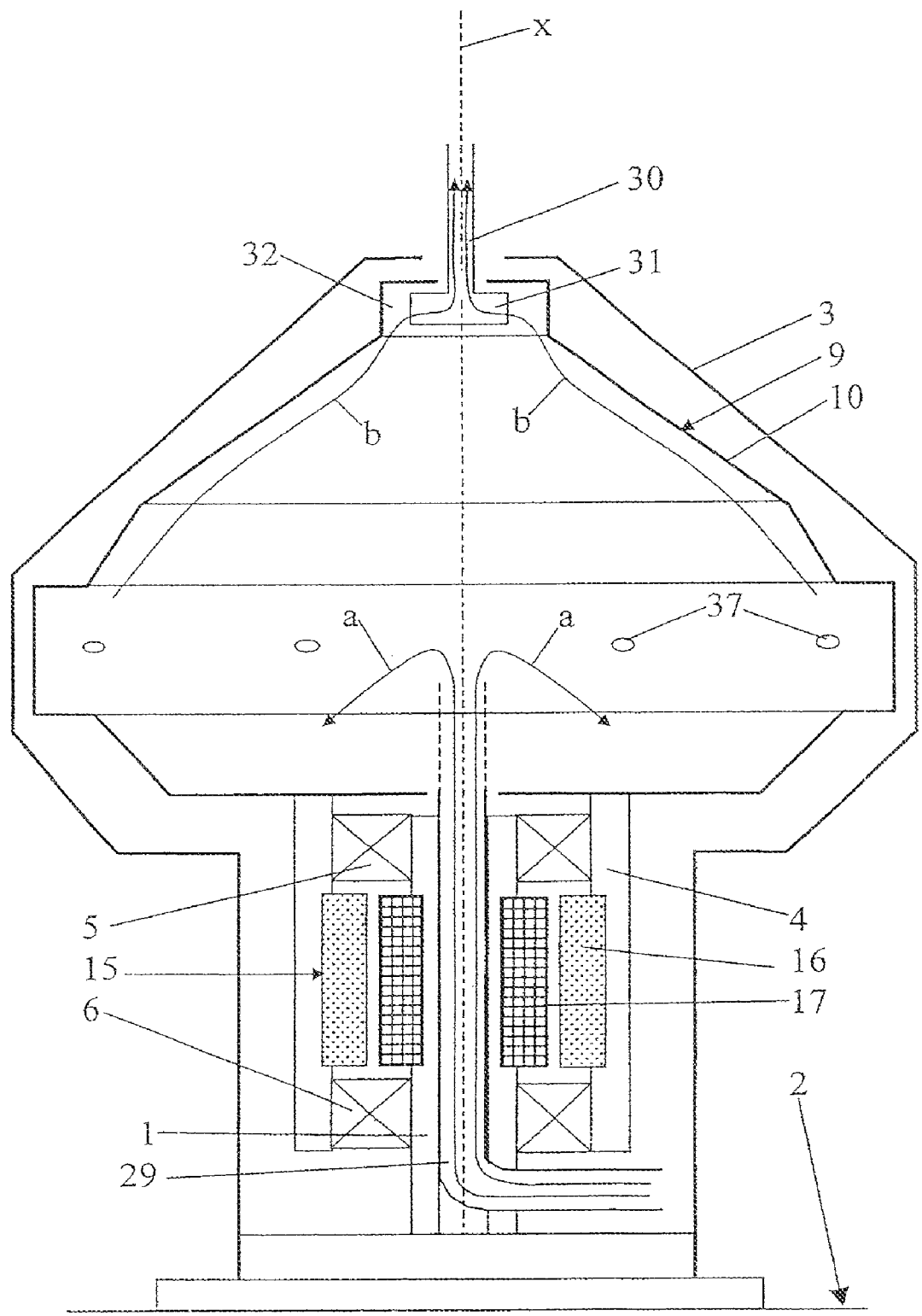
FIG. 4 discloses schematically a centrifugal separator according to a fourth embodiment of the invention.

According to the fourth embodiment disclosed in FIG. 4, the rotor 16 of the drive motor 15 surrounds the stator 17. The torque transmitting part 4 is fixedly connected to the centrifuge rotor 9 and may have a cylindrical shape with an inner wall. The stationary frame 1 extends upwards and into the torque transmitting part 4. The rotor 16 is fixedly connected to the torque transmitting part 4, and the stator 17 is fixedly connected to the frame 1 and provided inside the rotor 16. Also in the fourth embodiment, the drive motor 15 and the torque transmitting part 4 enclose a cavity 25 extending substantially co-axially, or co-axially, with centre axis x. The cavity 25 extends through the stationary frame 1. The cavity 25 may be limited by a stationary pipe 40 which projects into the inner separation space 11 of the centrifuge rotor 9.

The invention is not limited to the embodiments disclosed but may be varied and modified within the scope of the following claims. Especially, it is to be noted that variety of different examples of arrangement for feeding and discharging of the media may be achieved. For instance, the centrifugal separator may be designed with a hollow spindle through the whole centrifuge rotor, wherein the inlet and/or outlet channel, in addition to the first opening and the second opening, also may comprise a third opening in the inner separation space of the centrifuge rotor and a fourth opening outside the centrifuge rotor at an axial side turned from the drive motor for forming an inlet or outlet channel for a medium. The medium, i.e. the product to be cleaned through centrifugal separation and/or cleaned product may thus also be fed and discharged, respectively, through the channel via the second axial side of the centrifuge rotor where the drive motor is not located.

In the embodiments disclosed, the bearings are provided at a respective axial side of the drive motor. However, it is to be noted that the bearings may be provided in many different positions. For instance, both the bearings may be located at the same axial side of the drive motor or the centrifuge rotor. The bearings may also be provided in an integrated manner in the drive motor proper.

In the embodiments disclosed, the drive motor is an electric drive motor. As mentioned above it is possible, as an alternative, to design the drive motor as a hydraulic drive motor or a pneumatic drive motor.

What is claimed is:

1. A centrifugal separator for centrifuging components, contained in a liquid mixture and having different density, comprising
   a rotating centrifuge rotor, arranged to rotate around a centre axis and comprising a casing which defines an inner separation space,
   a set of separation discs provided in the inner separation space of the centrifuge rotor,
   at least two channels being in fluid communication with the separation space and comprising at least one inlet channel for supply of the liquid mixture of components to be separated to the separation space and at least one outlet channel for discharge of a component separated during operation from the separation space,
   a torque transmitting part around the centre axis and fixedly connected to the centrifuge rotor, and
   a drive motor, which drives the torque transmitting part and thus the centrifuge rotor in such a way that the centrifuge rotor is brought to rotate, wherein the drive motor comprises a stator and a rotor, which is fixedly connected to the torque transmitting part, wherein the rotor of the drive motor surrounds a cavity, through which liquid flows during operation of the centrifugal separator, and wherein the drive motor is provided axially outside the centrifuge rotor in the direction of the centre axis;
   the drive motor having a first axial end turned towards the centrifuge rotor and a second axial end turned away from the centrifuge rotor,
   the centrifugal separator comprising a stationary frame and a first bearing and a second bearing, which are connected to the frame,
   the torque transmitting part is rotatably journalled in the first bearing and the second bearing,
   the first bearing is provided between the drive motor and the centrifuge rotor, and
   the second bearing is provided outside the second axial end of the drive motor.

2. A centrifugal separator according to claim 1, wherein the drive motor is an electrical drive motor.

3. A centrifugal separator according to claim 1, wherein said channels extend concentrically with the centre axis.

4. A centrifugal separator according to claim 3, wherein said channels extend in opposite directions from the separation space.

5. A centrifugal separator according to claim 1, wherein the cavity forms at least one of said inlet channel and said outlet channel.

6. A centrifugal separator according to claim 1, wherein the stator of the drive motor surrounds the rotor.

7. A centrifugal separator according to claim 6, wherein the torque transmitting part is formed by a spindle, which is provided inside and connected to the rotor and which is hollow and forms at least one of said inlet channel and outlet channel.

8. A centrifugal separator according to claim 1, wherein the rotor of the drive motor surrounds the stator.

9. A centrifugal separator according to claim 1, wherein the cavity has a first opening in the separation space of the centrifuge rotor and a second opening outside the second axial end of the drive motor for forming of one of said inlet channel and said outlet channel.

10. A centrifugal separator according to claim 1, wherein the centrifugal separator comprises a stationary pipe, which is provided in the cavity and extends between the inner separation space of the centrifuge rotor and a position outside the centrifuge rotor for forming an inlet or outlet channel for a medium.

11. A centrifugal separator according to claim 10, wherein the stationary pipe has an opening outside the second axial end of the drive motor.

12. A centrifugal separator according to claim 10, wherein the stationary pipe has an opening outside the second axial end of the drive motor.

13. A centrifugal separator according to claim 1, wherein the stator of the drive motor is connected to the frame.

14. A centrifugal separator according to claim 1, wherein each separation disc has a conical shape, wherein the separation discs are provided on each other in a stack.

15. A centrifugal separator according to claim 1, wherein the stator of the drive motor comprises electrical windings, and the rotor of the drive motor comprises at least one permanent magnet.

16. A centrifugal separator according to claim 1, wherein the drive motor comprises an electric synchron motor.

* * * * *